US009162258B1

(12) United States Patent
Sun et al.

(10) Patent No.: US 9,162,258 B1
(45) Date of Patent: Oct. 20, 2015

(54) WASTED MATERIAL SEPARATING DEVICE

(71) Applicants: BOE Technology Group Co., Ltd., Beijing (CN); Beijing BOE Display Technology Co., Ltd., Beijing (CN)

(72) Inventors: Fuyuan Sun, Beijing (CN); Bin Cao, Beijing (CN); Hongyan Guo, Beijing (CN); Yang Xiao, Beijing (CN)

(73) Assignees: BOE Technology Group Co., Ltd., Beijing (CN); Beijing BOE Display Technology Co., Ltd., Beijing (CN)

( * ) Notice: Subject to any disclaimer, the term of this patent is extended or adjusted under 35 U.S.C. 154(b) by 0 days.

(21) Appl. No.: 14/516,958

(22) Filed: Oct. 17, 2014

(30) Foreign Application Priority Data

Jun. 23, 2014 (CN) ...................... 2014 2 0337211 U

(51) Int. Cl.
*B07C 5/00* (2006.01)
*B07C 5/36* (2006.01)

(52) U.S. Cl.
CPC ..................................... *B07C 5/365* (2013.01)

(58) Field of Classification Search
CPC ............ B24B 9/00; B24B 41/06; B07C 5/365
USPC .......................................................... 209/643
See application file for complete search history.

(56) References Cited

U.S. PATENT DOCUMENTS 3,206,026 A * 9/1965 Fouse et al. .................... 209/530
4,105,122 A * 8/1978 Flood et al. .................... 209/556
4,760,909 A * 8/1988 Dudley et al. ............ 198/370.12
5,297,710 A * 3/1994 Juras ................................ 225/2
7,583,351 B2 * 9/2009 Yoo et al. ...................... 349/187

* cited by examiner

*Primary Examiner* — Terrell Matthews
(74) *Attorney, Agent, or Firm* — Westman, Champlin & Koehler, P.A.

(57) ABSTRACT

The present invention provides a wasted material separating device comprising: a base station for placing a panel thereon, wherein a wasted material to be separated is on the panel; a support frame; a first guide rail mounted on one side of the support frame away from the base station and extending in a direction toward the base station; a support member slidably mounted on the first guide rail, and a first drive device connected with the support member, the first drive device being arranged to drive the support member to slide along the first guide rail; a first vacuum adsorption plate for adsorbing the wasted material, one end of which is mounted on the support member via a bearing, and the other end is lapped and connected with the support member when the first vacuum adsorption plate is horizontally placed; and a second drive device connected with the first vacuum adsorption plate and arranged to drive the first vacuum adsorption plate to rotate about the bearing. Thus, the wasted material can be easily and quickly removed from the panel and residual of the wasted material is avoided.

15 Claims, 5 Drawing Sheets

WASTED MATERIAL SEPARATING DEVICE

CROSS-REFERENCE TO RELATED APPLICATION

This application claims the benefit of Chinese Patent Application No. 201420337211.X filed on Jun. 23, 2014 in the State Intellectual Property Office of China, the whole disclosure of which is incorporated herein by reference.

BACKGROUND OF THE INVENTION

1. Field of the Invention

Embodiments of the present invention relate to a wasted material separating device 2. Description of the Related Art In manufacturing a liquid crystal display panel (Liquid Crystal Display, LCD) in prior arts, after cutting the glass panel, the panel can separated from wasted glass strips by following three ways:

moving the wasted glass strips away by using a chuck;

manually moving the wasted glass strips away; and separating the panel from the wasted glass by pushing a wasted glass region at periphery of the panel by using pins of a push rod provided at periphery of a robot arm chuck.

There are, however, some disadvantages in the above ways:

In the way of moving the wasted glass strips away by using a chuck, it is difficult to control operating parameters such as pressure, height and clamping amount. These operating parameters will affect production of products, and it will be difficult to control operating effects since it is not easy to control the operating parameters.

In the manual moving way, it will be difficult to control operating effects due to differences in individuals.

In the way of removing the wasted glass by using pins of a push rod provided at periphery of a robot arm chuck, since the wasted glass strip is applied by external force at a point thereon, a phenomenon will be easily caused in which small segments of wasted glass strips remain. Further, in process of cutting the panel, a low pressure cutting is often used to ensure strength at an edge of the panel and to reduce horizontal cracks generated due to cutting, however, vertical cracks generated in the low pressure cutting are smaller and thus can not penetrate through the panel, wasted glass strips can not be stripped off by using the pins of the push rod, and undesirable phenomena such as breakage of the panel or the like will occur if air pressure is increased.

Thus, since factors are difficult to be controlled during the separating process when using the above separating ways, residuals of the wasted materials may remain finally.

SUMMARY OF THE INVENTION

In order to solve the above and other problems in prior arts, embodiments of the present invention provide a wasted material separating device, which can easily and quickly remove a wasted material from the panel and thus avoid residuals of the wasted material.

Embodiments of the present invention provide a wasted material separating device comprising: a base station for placing a panel thereon, wherein a wasted material to be separated is on the panel; a support frame; a first guide rail mounted on one side of the support frame away from the base station and extending in a direction toward the base station; a support member slidably mounted on the first guide rail, and a first drive device connected with the support member, the first drive device being arranged to drive the support member to slide along the first guide rail; a first vacuum adsorption plate for adsorbing the wasted material, one end of which is mounted on the support member via a bearing, and the other end thereof is lapped and connected with the support member when the first vacuum adsorption plate is horizontally placed; and a second drive device connected with the first vacuum adsorption plate and arranged to drive the first vacuum adsorption plate to rotate about the bearing.

Embodiments of the present invention further provide a method of separating a wasted material from a panel by using the above wasted material separating device, comprising steps of:

1) placing the panel with the wasted material to be separated thereon onto the base station;

2) driving the support member to slide along the first guide rail through the first drive device until the support member slides to a position above the wasted material;

3) driving the first vacuum adsorption plate through the second drive device so that the first vacuum adsorption plate is rotated about the bearing and begins to absorb one end of the wasted material;

4) driving the first vacuum adsorption plate through the second drive device so that the first vacuum adsorption plate brings the wasted material away; and 5) driving the support member to slide along the first guide rail through the first drive device so as to bring the first vacuum adsorption plate away from the base station, and controlling the first vacuum adsorption plate to release the wasted material when the first vacuum adsorption plate reaches a predetermined position.

REFERENCE NUMBERS

Figure 1:
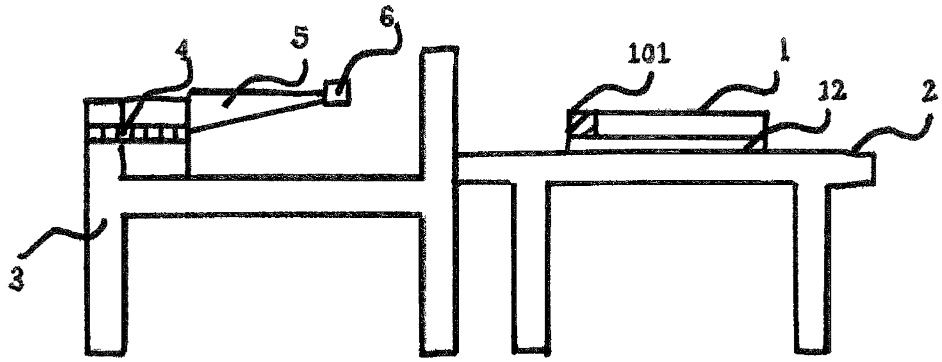
FIG. 1 is a side view showing a wasted material separating device according to embodiments of the present invention.

1—panel,

1'—liquid crystal display panel of one size,

1"—liquid crystal display panel of another size,

101—wasted material,
2—base station,
201—guide groove,
3—support frame,
4—first guide rail,
5—support member,
6—first vacuum adsorption plate,
7—bearing,
8—second guide rail,
9—sensor,
10—base,
11—third guide rail,
12—second vacuum adsorption plate,
13—connecting rod,
131—central shaft of connecting rod,
132—upper connecting rod,
133—lower connecting rod,
14—conveying robot arm.

DETAILED DESCRIPTION OF PREFERRED EMBODIMENTS OF THE INVENTION

Exemplary embodiments of the present invention will be described hereinafter in detail with reference to the attached drawings, wherein the like reference numerals refer to the like elements. The present invention may, however, be embodied in many different forms and should not be construed as being limited to the embodiment set forth herein; rather, these embodiments are provided so that the present invention will be thorough and complete, and will fully convey the concept of the disclosure to those skilled in the art.

According to a general inventive concept according to the present invention, there is provided a wasted material separating device comprising: a base station for placing a panel thereon, wherein a wasted material to be separated is on the panel; a support frame; a first guide rail mounted on one side of the support frame away from the base station and extending in a direction toward the base station; a support member slidably mounted on the first guide rail, and a first drive device connected with the support member, the first drive device being arranged to drive the support member to slide along the first guide rail; a first vacuum adsorption plate for adsorbing the wasted material, one end of which is mounted on the support member via a bearing, and the other end thereof is lapped and connected with the support member when the first vacuum adsorption plate is horizontally placed; and a second drive device connected with the first vacuum adsorption plate and arranged to drive the first vacuum adsorption plate to rotate about the bearing.

According to embodiments of the present invention, there is further provided a method of separating a wasted material from a panel by using the above wasted material separating device, comprising steps of:

1) placing the panel with the wasted material to be separated thereon onto the base station;

2) driving the support member to slide along the first guide rail through the first drive device until the support member slides to a position above the wasted material;

3) driving the first vacuum adsorption plate through the second drive device so that the first vacuum adsorption plate is rotated about the bearing and begins to absorb one ends of each wasted material;

4) driving the first vacuum adsorption plate through the second drive device so that the first vacuum adsorption plate brings the wasted material away; and 5) driving the support member to slide along the first guide rail through the first drive device so as to bring the first vacuum adsorption plate away from the base station, and controlling the first vacuum adsorption plate to release the wasted material when the first vacuum adsorption plate reaches a predetermined position.

Further in the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A vacuum adsorption plate provided according to embodiments of the present invention will be firstly described.

The vacuum adsorption plate comprises a vacuum adsorption surface, in which at least one vacuum adsorption hole is provided, and number and arrangement positions of the vacuum adsorption hole may be set as required. According to embodiments of the present invention, the vacuum adsorption holes are symmetrically arranged in the vacuum adsorption surface with a central position of the vacuum adsorption surface as a symmetry axis. Each vacuum adsorption hole is connected with a vacuum pump through a pipe, and can be separately controlled to absorb and release a target object in operation. Prior art vacuum adsorption plates may be used in embodiments of the present invention.

Next, the wasted material separating device according to embodiments of the present invention will be described.

Figure 2:
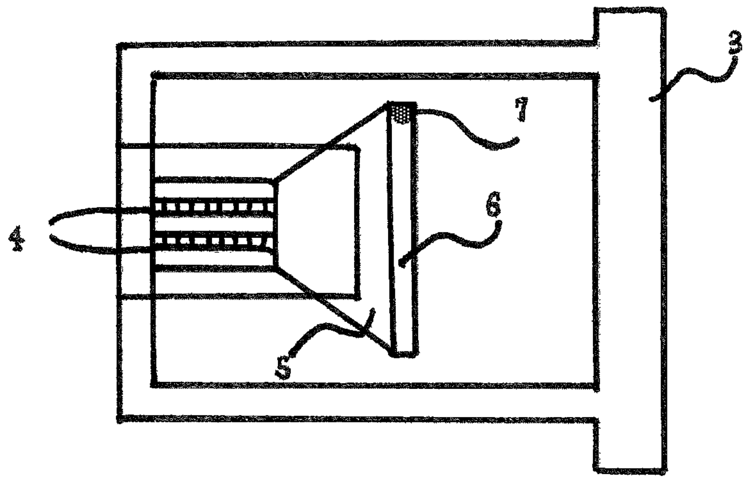
FIG. 2 is a top view showing a support frame of the wasted material separating device shown in FIG. 1.

As shown in FIG. 1, there is shown a wasted material separating device according to embodiments of the present invention, comprising:

a base station 2 for placing a panel 1 thereon, wherein a wasted material 101 to be separated is on the panel 1;

a support frame 3;

a first guide rail 4 mounted on one side of the support frame 3 away from the base station 2 and extending in a direction toward the base station 2;

a support member 5 slidably mounted on the first guide rail 4, and a first drive device (not shown in FIG. 1) connected with the support member 5, the first drive device being arranged to drive the support member 5 to slide along the first guide rail 4;

a first vacuum adsorption plate 6 for adsorbing the wasted material 101, one end of which is mounted on the support member 5 via a bearing 7, and the other end is lapped and connected with the support member 5 when the first vacuum adsorption plate is horizontally placed, as shown in FIG. 2; and a second drive device (not shown in FIG. 1) connected with the first vacuum adsorption plate 6 and arranged to drive the first vacuum adsorption plate 6 to rotate about the bearing 7.

In the above separating device according to embodiments of the present invention, by absorbing the wasted material through the first vacuum adsorption plate, and further by bringing the first vacuum adsorption plate to rotate about the bearing through the second drive device, the absorbed wasted material is separated from the panel. Since the absorption action to the wasted material provided by the first vacuum adsorption plate is uniformly distributed over the wasted material, no residual of the wasted material will remain.

Figure 3:
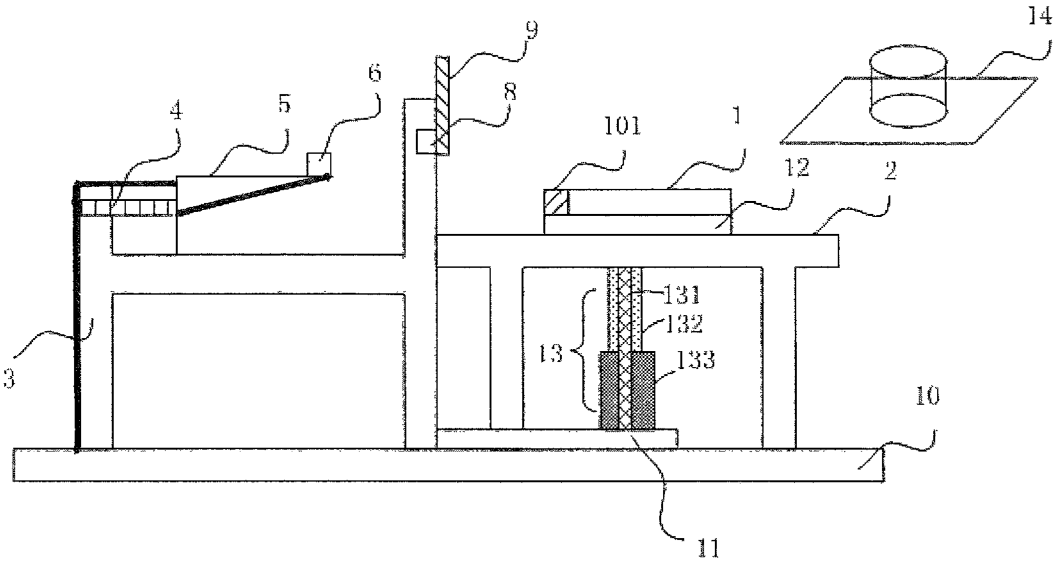
FIG. 3 is a side view showing another wasted material separating device according to embodiments of the present invention.

According to an embodiment of the present invention as shown in FIG. 3, the wasted material separating device may further comprise:

a second guide rail 8 arranged to be perpendicular to the first guide rail 4 in a horizontal plane and mounted on one side of the support frame 3 close to the base station 2;

at least two sensors 9, for example, cameras, slidably mounted on the second guide rail 8 for positioning the panel 1; and a third drive device (not shown in FIG. 3) connected with each of the sensors 9 and arranged to drive each sensor 9 to slide along the second guide rail 8.

Figure 4:
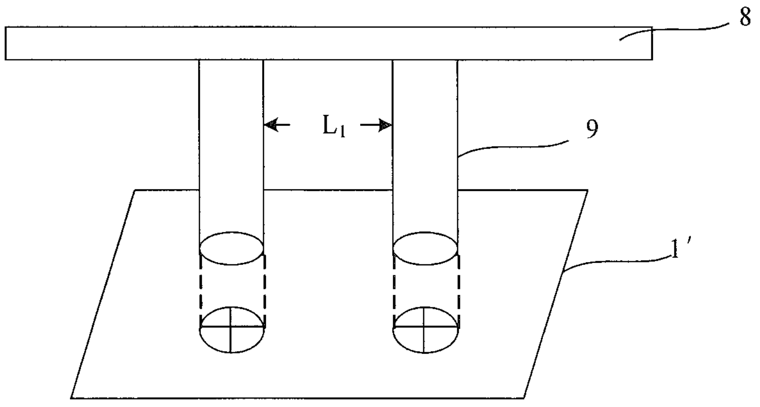
FIG. 4 is a schematic view showing positional relationships among various components when positioning and aligning a display panel of one size by using the separating device provided by embodiments of the present invention.

Alignment marks will be provided on cut panel, the sensors 9 are aligned with the alignment marks by adjusting positions of the sensors 9 on the second guide rail 8. For example, the alignment marks comprises cross marks as shown in FIG. 4. For a panel 1' having a size, it is determined that an angle by which the panel 1' is placed is not offset when two cross alignment marks are respectively present in central positions of field of view of respective sensors.

According to embodiments of the present invention as shown in FIG. 1 or 3, the support frame 3 is fixedly connected with one side of the base station 2. Thereby, a movement distance by which the panel or first vacuum adsorption plate 5 is moved can be reduced.

Figure 5:
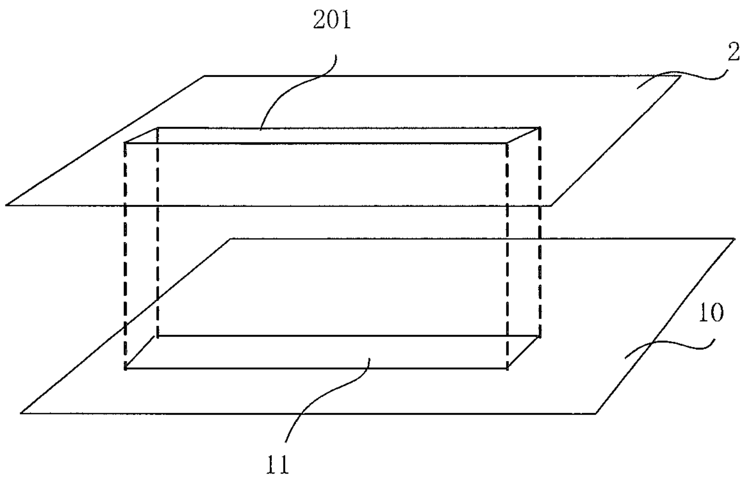
FIG. 5 is a schematic view showing a correspondence relationship between a guide groove and a third guide rail in the wasted material separating device shown in FIG. 3.

In one embodiment as shown in FIG. 5, the base station 2 is provided with a guide groove 201 thereon. Together with reference to FIGS. 3 and 5, the wasted material separating device may further comprise:

a base 10 onto which both the base station 2 and the support frame 3 are fixed;

a third guide rail 11 fixed on the base 10 and corresponding to the guide groove 201 in a vertical direction;

a second vacuum adsorption plate 12 provided on the base station for absorbing the panel 1;

a connecting rod 13, one end of which is fixedly connected with the second vacuum adsorption plate 12, and the other end is slidably mounted on the third guide rail 11; and a fourth drive device (not shown in FIG. 3) arranged to drive the connecting rod 13 to slide along the third guide rail 11 and to bring the second vacuum adsorption plate 12 to slide along the guide groove 201.

The second vacuum adsorption plate 12 is provided on the base station 2 and fix the panel 1; Further, the connecting rod 13 is driven by the fourth drive device so as to slide in a direction toward the first vacuum adsorption plate 6 and to bring the second vacuum adsorption plate 12 to slide together, thereby the panel 1 absorbed by the second vacuum adsorption plate 12 is conveyed in the direction toward the first vacuum adsorption plate 6, and is stopped and does not continue sliding forward when being conveyed to a predetermined position. Then, the support member 5 is brought by the first drive device to slide toward the base station 2 along the first guide rail 4, and is stopped from sliding forward after bringing the first vacuum adsorption plate 6 to slide to a position above and contact the wasted material 101, then, the wasted material 101 is absorbed by the first vacuum adsorption plate 6, and the first vacuum adsorption plate 6 is driven to rotate about the bearing by the second drive device, thereby separating the wasted material 101 from the panel 1; after separating the wasted material 101, the support member 5 is brought by the first drive device to slide in a reverse direction along the first guide rail, the wasted material 101 is stopped from being absorbed and discarded after the support member 5 slides to the predetermined position.

According to embodiments of the present invention, the present invention is not limited to the above, and for purpose of absorbing the wasted material, there is provided a relative movement between the first vacuum adsorption plate and the panel, which can be achieved by the above embodiments, that is, by respectively moving the first vacuum adsorption plate and the panel, or only moving the first vacuum adsorption plate, or only moving panel. Although embodiments of the present invention are described with respect to one way of achieving the relative movement, other ways are also within the scope of the present invention.

According to embodiments of the present invention, the connecting rod may be provided with a central shaft 131, and the wasted material separating device may further comprise:

a fifth drive device (not shown in FIG. 3) connected with the connecting rod 13 and arranged to drive the connecting rod 13 to rotate about its central shaft 131.

When the sensors 9 are not aligned with the alignment marks on the panel 1, the connecting rod 13 needs to be driven by the fifth drive device to rotate about its central shaft 131, so as to bring the second vacuum adsorption plate 12 and thus the panel 1 absorbed thereon to rotate, thereby the position of the panel 1 is calibrated so that the sensors 9 can be aligned with the alignment marks on the panel 1.

In embodiments of the present invention, the connecting rod 13 may comprises an upper connecting rod 132 and a lower connecting rod 133, wherein:

the upper connecting rod 132 has an upper end fixedly connected with the second vacuum adsorption plate 12 and a lower end connected to an upper end of the lower connecting rod 133;

a lower end of the lower connecting rod 133 is slidably mounted on the third guide rail 11; and the upper connecting rod 132 has a cross section area smaller than that of the lower connecting rod 133, that is, the upper connecting rod 132 is slenderer than the lower connecting rod 133, thereby saving materials and reducing costs. Since the lower connecting rod 133 is thicker than the upper connecting rod 132, the whole connecting rod 13 will be more stable during sliding.

In embodiments of the present invention, the upper connecting rod 132 has a length smaller than that of the lower connecting rod 133. As such, the stability of the connecting rod 13 is further ensured during sliding.

In embodiments of the present invention, a distance between a lower surface of the first vacuum adsorption plate 6 and the base 10 is larger than that between an upper surface of the base station 2 and the base 10 when the first vacuum adsorption plate 6 is horizontally placed. As such, the first vacuum adsorption plate 6 can absorb and separate the wasted material 101 from a position above the wasted material 101, and the wasted material 101 is easily released downward after the wasted material 101 is separated from the panel 1.

In actual applications, any one of the above drive devices may comprise a cylinder or motor, and any of the above drive devices, and connections between any one of the above drive devices and its corresponding components, may be achieved by using conventional techniques, which will not be repeatedly described herein.

Continuing referring to FIG. 3, in embodiments of the present invention, the wasted material separating device may further comprise:

a conveying robot arm 14 for conveying the panel 1 to the base station 2.

The conveying robot arm 14 may also be achieved by using conventional techniques.

An operating process of the wasted material separating device according to embodiments of the present invention will be described below.

A case, in which the panel is a liquid crystal display panel and the wasted material is a wasted glass strip will be described as an example. Of course, the panel is not limited to the liquid crystal display panel, for example may also be an organic light-emitting diode display panel, an electronic paper and the like.

According to embodiments of the present invention, there is provided a method of separating a wasted material from a panel by using the above wasted material separating device, comprising steps of:

1) placing the panel with the wasted material to be separated thereon onto the base station;

2) driving the support member to slide along the first guide rail through the first drive device until the support member slides to a position above the wasted material;

3) driving the first vacuum adsorption plate through the second drive device so that the first vacuum adsorption plate is rotated about the bearing and begins to absorb one ends of each wasted material;

4) driving the first vacuum adsorption plate through the second drive device so that the first vacuum adsorption plate brings the wasted material away; and 5) driving the support member to slide along the first guide rail through the first drive device so as to bring the first vacuum adsorption plate away from the base station, and controlling the first vacuum adsorption plate to release the wasted material when the first vacuum adsorption plate reaches a predetermined position.

According to embodiments of the present invention, the method may further comprise a step of calibrating a position of the panel. A distance between two sensors 9 on the second guide rail 8 is previously adjusted by the third drive device according to a distance between two alignment marks on the panel placed on the base station, so that the distance between the two sensors 9 is equal to the distance between two alignment marks on the panel placed on the base station.

Figure 6:
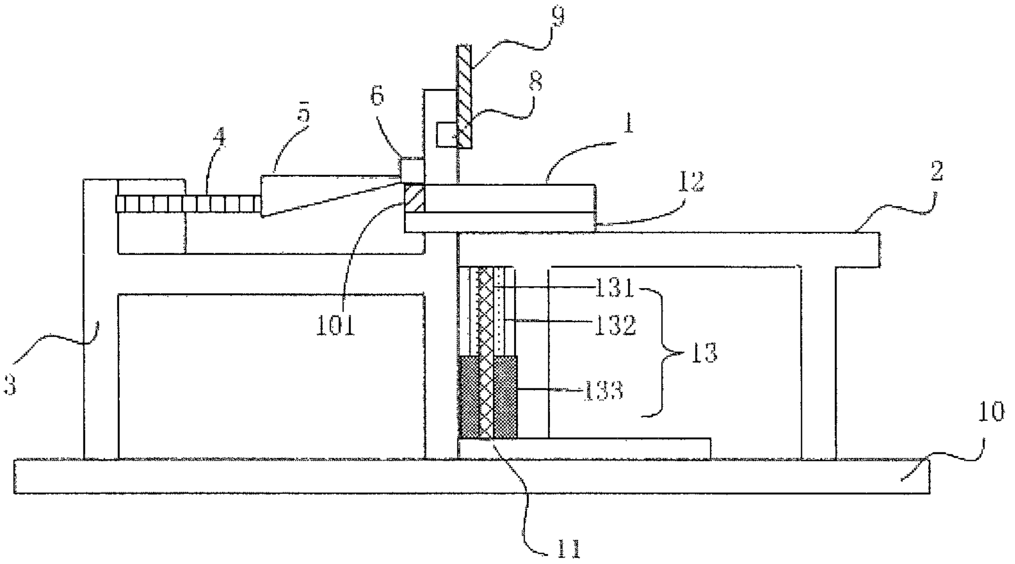
FIG. 6 is a schematic view showing positions of various components during separating the wasted material by using the wasted material separating device shown in FIG. 3.
Figure 7:
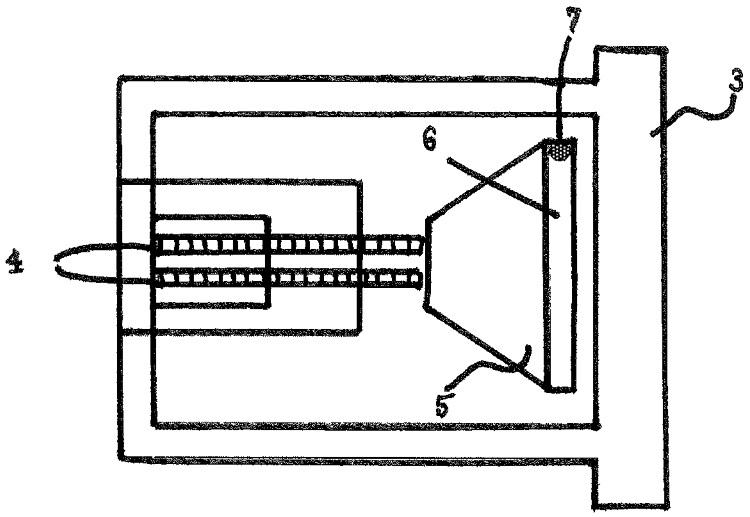
FIG. 7 is a top view showing a support frame in the wasted material separating device provided by embodiments of the present invention during separating the wasted material.
Figure 8:
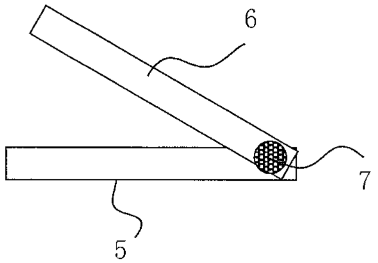
FIG. 8 is a schematic view showing a positional relationship after a first vacuum adsorption plate in the wasted material separating device provided by embodiments of the present invention is rotated about a bearing by an angle.

Continuing referring to FIG. 3, the liquid crystal display panel 1 with wasted glass strips to be separated thereon is conveyed to the base station 2 by the conveying robot arm 14, and the liquid crystal display panel 1 is absorbed and fixed by the second vacuum adsorption plate 12 provided on the base station 2;

further, the fourth drive device is driven to bring the connecting rod 13 to slide along the third guide rail 11, so as to bring the liquid crystal display panel 1 to slide to a position below the sensors 9; the liquid crystal display panel 1 is positioned by using two sensors 9, in actual implementations, an alignment mark may be provided on the liquid crystal display panel 1, the alignment mark may be, for example, a cross mark, and two camera sensors 9 are positioned and aligned according to the cross alignment marks on the liquid crystal display panel. If two cross alignment marks are present in central positions of field of view of the two camera sensors, it is determined that the current position of the liquid crystal display panel is not offset; if one or both of the two cross alignment marks is not present in the central positions of field of view of the two camera sensors, it is determined that the current position of the liquid crystal display panel 1 needs to be corrected, and further, the fifth drive device is driven according to an offset amount record by the camera sensors so as to drive the connecting rod 13 to rotate about its central shaft 131, in turn, rotation of the connecting rod 13 brings the second vacuum adsorption plate 12 to rotate, so as to adjust the position of the liquid crystal display panel 1, until the two cross alignment marks are present in central positions of field of view of the two camera sensors;

after correcting the position of the liquid crystal display panel 1, the fourth drive device continues to be driven to bring the connecting rod 13 to continue sliding forward along the third guide rail until reaching a predetermined position, then, the first drive device is driven to bring the support member 5 to slide along the first guide rail 4, and thereby to bring the first vacuum adsorption plate 6 to move in a direction toward the liquid crystal display panel 1, until the first vacuum adsorption plate 6 is moved to a position above the wasted glass strip 101, at this time, positions of respective components are shown in FIG. 6 or FIG. 7;

further, the second drive device is driven to bring the first vacuum adsorption plate 6 to rotate about the bearing 7, so that one end of wasted glass strip 101 begins to be absorbed by the first vacuum adsorption plate 6 as shown in FIG. 8, until the whole wasted glass strip is fully absorbed, at this time, the first vacuum adsorption plate 6 is in a horizontal state;

further, the second drive device continued to be driven to cause the first vacuum adsorption plate 6 with absorbed wasted glass strip 101 to rotate about the bearing 7 in a reverse direction so as to pick up the wasted glass strip from one end of the wasted glass strip, until the wasted glass strip 101 is separated from the liquid crystal display panel 1; further, the first drive device is driven to bring the support member 5 to slide along the first guide rail in a direction away from the base station 2, and thereby to bring the first vacuum adsorption plate 6 to move in the direction away from the base station 2, so as to bring the wasted glass strip 101 away from the position where the liquid crystal display panel 1 is located; when reaching a predetermined position, the first vacuum adsorption plate 6 is further controlled to release the wasted glass strip 101, as such, separation of the wasted glass strip from one liquid crystal display panel is finished.

Figure 9:
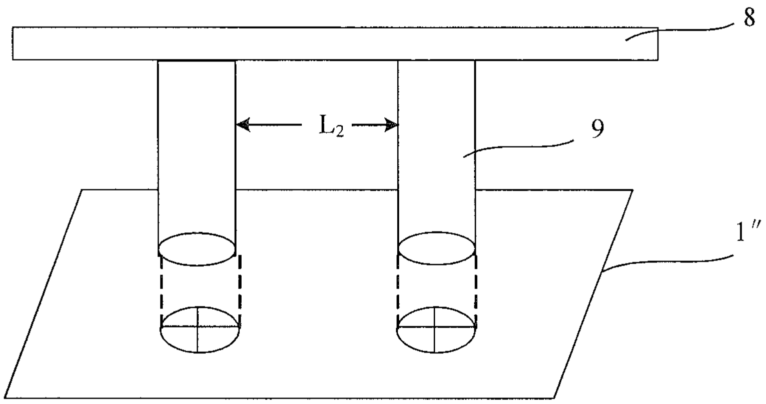
FIG. 9 is a schematic view showing positional relationships among various components when positioning and aligning a display panel of another size by using the separating device provided by embodiments of the present invention.

It is noted that when the liquid crystal display panel 1 is changed in size, for example, if a distance between two cross alignment marks on a previous liquid crystal display panel 1' is $L_1$ as shown in FIG. 4, and when a distance two cross alignment marks on the current liquid crystal display panel 1" is $L_2$ as shown in FIG. 9, two third drive devices need to be driven when positioning the current liquid crystal display panel 1", and the two third drive device will bring respective sensors 9 to slide along the second guide rail 8 so as to adjust a space between two sensors 9 from $L_1$ to $L_2$, thereby positioning the current display panel 1". Here, since liquid crystal display panels of the same type have the same size, and wasted glass strips also have the same size, the liquid crystal display panels of the same type are handled as the same batch when separating the wasted glass strips, thus, the space between two sensors 9 needs to be adjusted only when changing the type of the liquid crystal display panel to be handled.

The above separating process is only an example, and other appropriate steps may be employed by those skilled in the art as required to separate the wasted material from the panel.

In summary, in the above separating device and method provided according to embodiments of the present invention, the wasted material is absorbed by the first vacuum adsorption plate, and further, the second vacuum adsorption plate is brought to rotate about the bearing by the second drive device, thereby easily and quickly separated the absorbed wasted material from the panel. Since the absorption action to the wasted material provided by the first vacuum adsorption plate is uniformly distributed over the wasted material, no residual of the wasted material will remain.

Although several exemplary embodiments have been shown and described, it would be appreciated by those skilled in the art that various changes or modifications may be made in these embodiments without departing from the principle and spirit of the disclosure, the scope of which is defined in the claims and their equivalents.

What is claimed is:

1. A wasted material separating device comprising:

a base station for placing a panel thereon, wherein a wasted material to be separated is on the panel;

a support frame;

a first guide rail mounted on one side of the support frame away from the base station and extending in a direction toward the base station;

a support member slidably mounted on the first guide rail, and a first drive device connected with the support member, the first drive device being arranged to drive the support member to slide along the first guide rail;

a first vacuum adsorption plate for adsorbing the wasted material, one end of which is mounted on the support member via a bearing, and the other end thereof is lapped and connected with the support member when the first vacuum adsorption plate is horizontally placed; and a second drive device connected with the first vacuum adsorption plate and arranged to drive the first vacuum adsorption plate to rotate about the bearing.

2. The wasted material separating device according to claim 1, further comprising:

a second guide rail arranged to be perpendicular to the first guide rail in a horizontal plane and mounted on one side of the support frame close to the base station;

at least two sensors slidably mounted on the second guide rail for positioning the panel; and a third drive device connected with each of the sensors and arranged to drive each sensor to slide along the second guide rail.

3. The wasted material separating device according to claim 1, wherein the support frame is fixed to one side of the base station.

4. The wasted material separating device according to claim 1, wherein the base station is provided with a guide groove thereon, and the wasted material separating device further comprises:

a base onto which both the base station and the support frame are fixed;

a third guide rail fixed on the base and corresponding to the guide groove in a vertical direction;

a second vacuum adsorption plate provided on the base station for absorbing the panel;

a connecting rod, one end of which is fixedly connected with the second vacuum adsorption plate, and the other end thereof is slidably mounted on the third guide rail; and a fourth drive device arranged to drive the connecting rod to slide along the third guide rail and to bring the second vacuum adsorption plate to slide along the guide groove.

5. The wasted material separating device according to claim 4, wherein the connecting rod is provided with a central shaft, and the wasted material separating device further comprises:

a fifth drive device connected with the connecting rod and arranged to drive the connecting rod to rotate about its central shaft.

6. The wasted material separating device according to claim 5, wherein the connecting rod comprises an upper connecting rod and a lower connecting rod, and the upper connecting rod has a cross section area smaller than that of the lower connecting rod, and wherein:

the upper connecting rod has an upper end fixedly connected with the second vacuum adsorption plate and a lower end connected to an upper end of the lower connecting rod; and a lower end of the lower connecting rod is slidably mounted on the third guide rail.

7. The wasted material separating device according to claim 5, wherein the upper connecting rod has a length smaller than that of the lower connecting rod.

8. The wasted material separating device according to claim 4, wherein a distance between a lower surface of the first vacuum adsorption plate and the base is larger than that between an upper surface of the base station and the base, when the first vacuum adsorption plate is horizontally placed.

9. The wasted material separating device according to claim 1, wherein the first drive device and the second drive device comprises cylinders or motors.

10. The wasted material separating device according to claim 2, wherein the third drive device comprises a cylinder or motor.

11. The wasted material separating device according to claim 4, wherein the fourth drive device comprises a cylinder or motor.

12. The wasted material separating device according to claim 5, wherein the fifth drive device comprises a cylinder or motor.

13. The wasted material separating device according to claim 1, further comprising:

a conveying robot arm for conveying the panel to the base station.

14. A method of separating a wasted material from a panel by using the wasted material separating device of claim 1, comprising steps of:

1) placing the panel with the wasted material to be separated thereon onto the base station;

2) driving the support member to slide along the first guide rail through the first drive device until the support member slides to a position above the wasted material;

3) driving the first vacuum adsorption plate through the second drive device so that the first vacuum adsorption plate is rotated about the bearing and begins to absorb one end of the wasted material;

4) driving the first vacuum adsorption plate through the second drive device so that the first vacuum adsorption plate brings the wasted material away; and 5) driving the support member to slide along the first guide rail through the first drive device so as to bring the first vacuum adsorption plate away from the base station, and controlling the first vacuum adsorption plate to release the wasted material when the first vacuum adsorption plate reaches a predetermined position.

15. The method according to claim 14, wherein the step 1) further comprises calibrating a position of the panel.

* * * * *